Sept. 22, 1964 R. J. BROADWELL 3,149,605
OUTBOARD PROPULSION UNIT STEERING ASSIST APPARATUS
Filed March 1, 1962 6 Sheets-Sheet 1

INVENTOR
ROBERT J. BROADWELL

BY Cushman, Darby & Cushman
ATTORNEY

Sept. 22, 1964   R. J. BROADWELL   3,149,605
OUTBOARD PROPULSION UNIT STEERING ASSIST APPARATUS
Filed March 1, 1962   6 Sheets-Sheet 2

INVENTOR
ROBERT J. BROADWELL
BY Cushman, Darby & Cushman
ATTORNEY

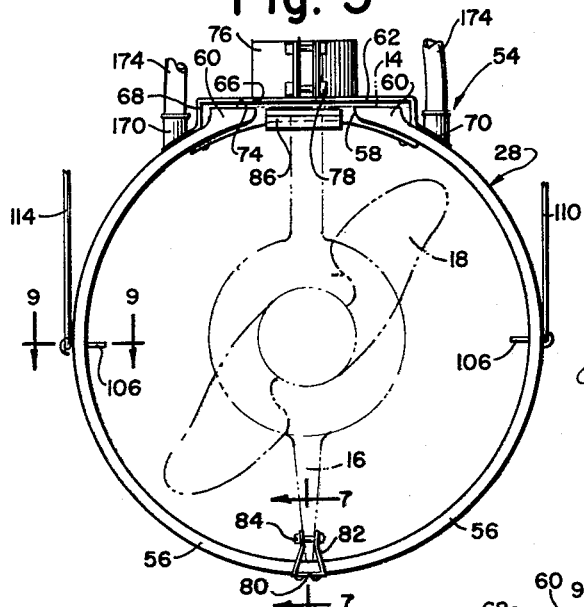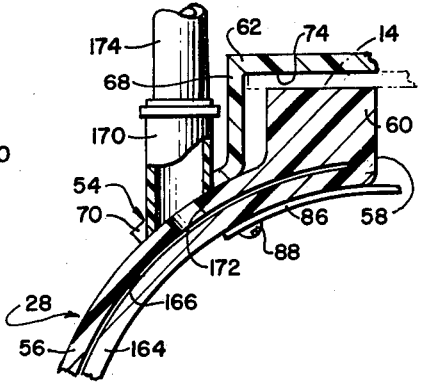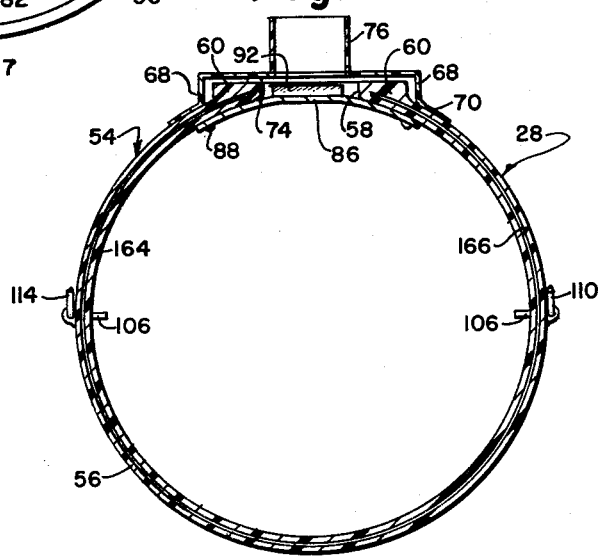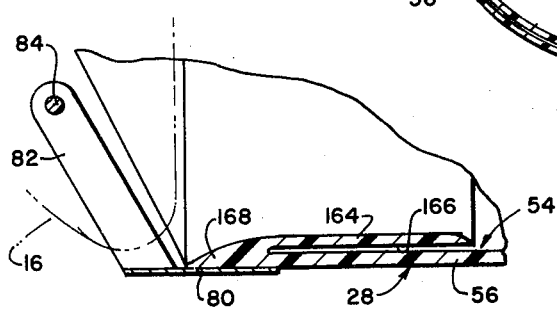

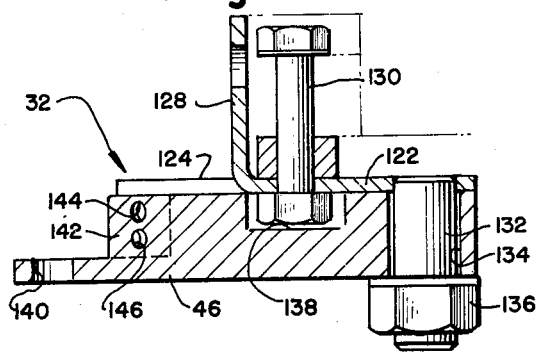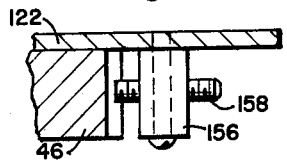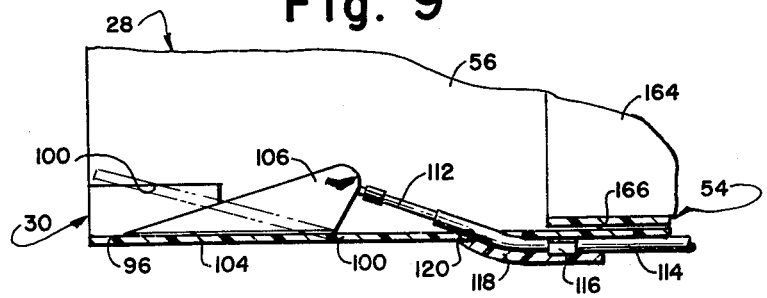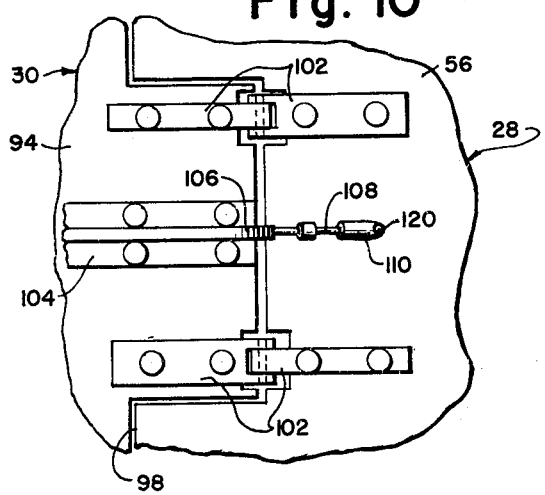

Sept. 22, 1964 R. J. BROADWELL 3,149,605
OUTBOARD PROPULSION UNIT STEERING ASSIST APPARATUS
Filed March 1, 1962 6 Sheets-Sheet 5

INVENTOR
ROBERT J. BROADWELL

BY Cushman, Darby & Cushman
ATTORNEY

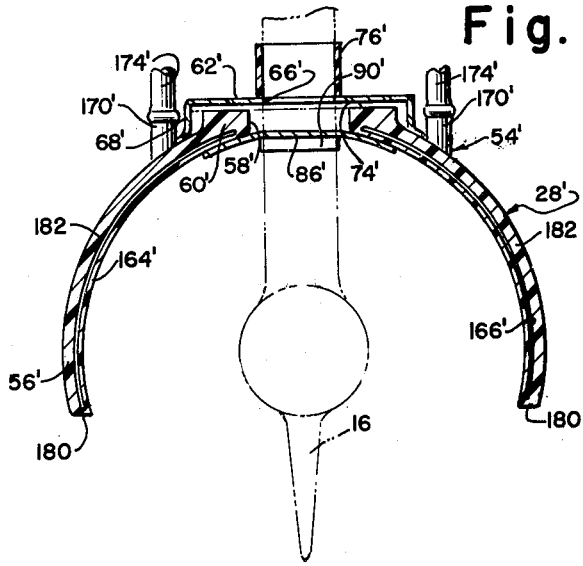
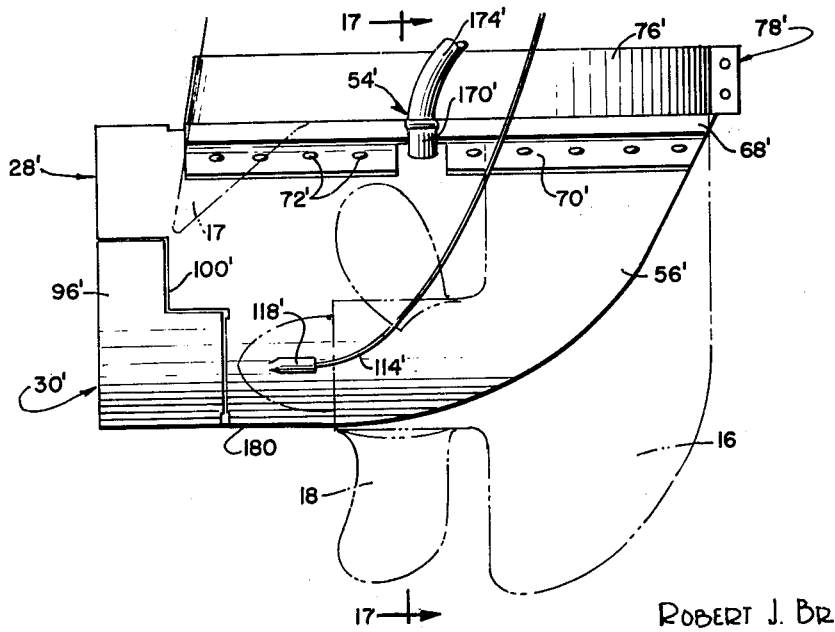

United States Patent Office 3,149,605
Patented Sept. 22, 1964

3,149,605
OUTBOARD PROPULSION UNIT STEERING
ASSIST APPARATUS
Robert J. Broadwell, Cleveland, Ohio, assignor, by mesne assignments, to Maremont Corporation, Chicago, Ill., a corporation of Illinois
Filed Mar. 1, 1962, Ser. No. 176,511
25 Claims. (Cl. 115—18)

This invention relates to the steering of water craft and more particularly to apparatus for effecting steering operations of an outboard propulsion unit such as a conventional outboard motor or the like.

As is well known, outboard motors of the type currently in widespread use are mounted on boats for pivotal movement about an upright axis so that by pivoting the entire unit the boat can be appropriately steered by changing the relative position of the outboard motor about the upright axis with respect to the boat. In a conventional installation the outboard motor includes a steering rod or arm which extends inwardly of the boat in a position to be conveniently grasped by the occupant of the rear seat thereof. In more elaborate installations, the outboard motor is steered by remote control from a forward mounted steering wheel. There has been considerable development in various remote control systems whereby adequate mechanical advantage can be obtained in the system so that the effort required in steering the boat is reduced to a minimum. Moreover, it has been proposed to actually provide a power steering system for the outboard motor. All of these developments and proposals provide a clear indication that some difficulties are presented in the steering of boats by pivoted outboard motors from the standpoint that such steering requires considerable effort. Many of the remote control systems for effecting the steering action of an outboard motor are quite elaborate and extremely costly.

While the present invention has been described above as being applicable to outboard motors, it will be understood that it is equally applicable to the so-called inboard-outboard motor and the term "outboard propulsion unit" will be utilized in the subsequent description to designate both conventional outboard motor units and the outboard unit of an inboard-outboard system. It will be understood, however, that the steering features of the present invention have applicability only to those outboard propulsion units which are mounted for steering movements with respect to the boat.

An object of the present invention is the provision of a vane or rudder assist steering means for an outboard propulsion unit which is embodied in a stabilizing anti-cavitation guard adapted to be mounted in substantially surrounding relation to the propeller of the unit so as to provide a greater stabilization to the steering of the unit, to protect the propeller of the unit from foreign objects and to prevent air cavitation in the action of the propeller.

Another object of the present invention is the provision of a stabilizing guard of the type described which is effective to stabilize the steering of the boat, to prevent foreign objects from damaging the propeller of an outboard propulsion unit, and to prevent cavitation of air in the operation of the propeller.

Another object of the present invention is the provision of a stabilizing guard for the propeller of an outboard propulsion unit having a syphon or jet action pump structure embodied therein which can be conveniently utilized to pump water from the bottom or bilge of the boat.

These and other objects of the present invention will become more apparent during the course of the following detailed description and appended claims.

The invention may best be understood with reference to the accompanying drawings wherein illustrative embodiments are shown.

In the drawings:

FIGURE 5 is a front elevational view of the structure shown in FIGURE 3;

FIGURE 6 is a sectional view taken along the line 6—6 of FIGURE 4;

FIGURE 7 is an enlarged fragmentary sectional view taken along the line 7—7 of FIGURE 5;

FIGURE 8 is an enlarged fragmentary sectional view taken along the line 8—8 of FIGURE 3;

FIGURE 9 is an enlarged fragmentary sectional view taken along the line 9—9 of FIGURE 5;

FIGURE 10 is an enlarged fragmentary interior elevational view showing the manner in which the vane or rudder elements are connected to the guard member;

FIGURE 14 is a cross-sectional view taken along the line 14—14 of FIGURE 11;

FIGURE 15 is a fragmentary sectional view taken along the line 15—15 of FIGURE 12;

FIGURE 16 is a side elevational view of a guard unit of modified construction; and FIGURE 17 is a cross-sectional view taken along the line 17—17 of FIGURE 16.

Figure 1:
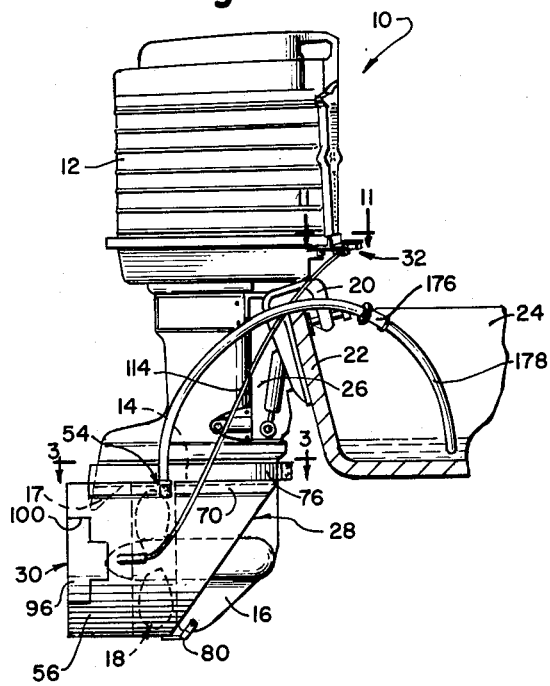
FIGURE 1 is a side elevational view of an outboard propulsion unit embodying the principles of the present invention.

Referring now more particularly to the drawings, there is shown in FIGURE 1 an outboard propulsion unit generally indicated at 10, embodying the principles of the present invention. As shown, the propulsion unit 10 is of conventional outboard motor construction and includes the usual frame or housing 12 having an internal combustion engine (not shown) of conventional design mounted in the upper portion thereof, a conventional horizontally extending cavitation plate 14 formed in the lower portion thereof, a forward vertical fin or skeg 16 extending downwardly from the cavitation plate 14, a rearward vertical fin 17 providing an exhaust outlet, and a propeller 18 fixed to a horizontal shaft (not shown) extending from the central portion of the skeg and drivingly connected with the internal combustion engine through conventional gearing (not shown) within the housing.

The unit 10 also includes a C-clamp construction 20 which is arranged to receive and to be fixedly secured to the upper portion of a transom 22 of a boat 24. The housing 12 is dirigibly connected with the C-clamp construction 20 for pivotal movement about a horizontal transverse axis and for steering movements about an upright axis. To this end, the C-clamp structure 20 is pivotally connected, as by a horizontal transversely extending shaft (not shown), to an intermediate mounting bracket 26, which bracket is, in turn, pivotally connected with the forward central portion of the frame 12 by a horizontally extending shaft (not shown).

It will be understood that the structure of the outboard motor propulsion unit as described above is conventional in nature and the particular construction described is exemplary only. The invention as hereinafter described has general applicability to all makes and models of outbroad motors as well as all steerable outboard propulsion units including the outboard propulsion units of the relatively new inboard-outboard systems.

In FIGURE 1 the steering apparatus of the present invention is shown applied, as an attachment, to the conventional outboard motor propulsion unit but it will be understood that the invention may be made as an integral part of the outboard propulsion unit as originally manufactured. The steering attachment shown in FIGURE 1 includes a stabilizing anti-cavitation guard unit, generally indicated at 28, which is suitably secured to the frame 12 of the unit 10 adjacent the cavitation plate 14 and lower end of the skeg 16 and disposed in surrounding relation to the propeller 18. The guard unit 28 includes rudder means, generally indicated at 30, which is disposed rearwardly of the propeller 18 in the path of the prop wash thereof. The rudder means 30 is mounted for steering movements in opposite directions in the prop wash so as to effect steering movements of the outboard propulsion unit 10 in opposite directions irrespective of the relative position of the unit with respect to the boat.

In order to effect these steering movements of the rudder means, there is provided a steering bracket unit, generally indicated at 32, which is mounted on the frame 12 of the propulsion unit and operatively connected with the rudder means. The steering bracket unit 32 is capable of being directly manually actuated to effect the movements of the rudder means 30 which in turn effects steering movements of the unit 10 with respect to the boat but preferably is arranged to cooperate with a remote controlled forward steering system of the boat, generally indicated at 34.

Figure 2:
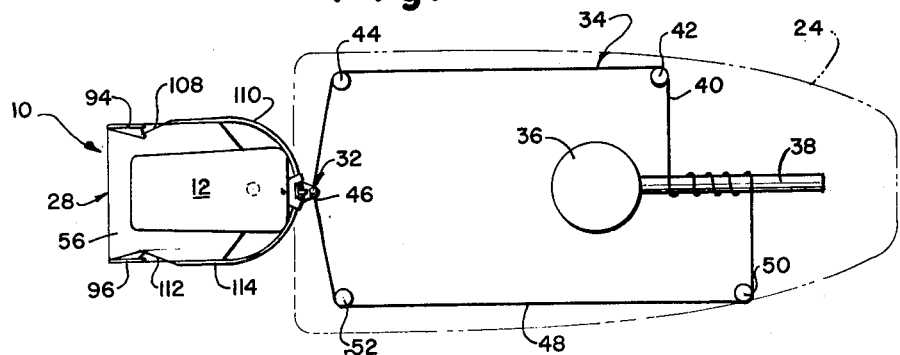
FIGURE 2 is a top plan view schematically illustrating the manner in which the unit shown in FIGURE 1 is connected with a conventional remote control steering system for an outboard motor.

Referring now more particularly to FIGURE 2, the remote control steering system may be of any conventional construction, the system 34 shown in FIGURE 2 constituting merely a schematic diagram of such a system. Briefly, it will be noted that the system includes a steering wheel 36 connected with a rotary steering column 38. One end of a first steering cable 40 is fixed to the steering column and wrapped therearound and extends therefrom around a forward pulley 42 and then around a rearward pulley 44 and has its opposite end connected to a pivoted steering arm 46 of the steering bracket unit 32. In a like manner, a second steering cable 48 is fixed to the steering column 38 and has one end thereof wrapped around the steering column in opposed relation to the adjacent end of the cable 40 and extends around a forward pulley 50 and then around a rearward pulley 52 and has its opposite end connected with the steering arm 46.

The guard unit 28 also includes a pump means, generally indicated at 54, when is disposed in the path of the prop wash and is operable to create a space of low pressure therein capable of being communicated with the bottom or the bilge of the boat for purposes of removing accumulated water therein.

Figure 3:
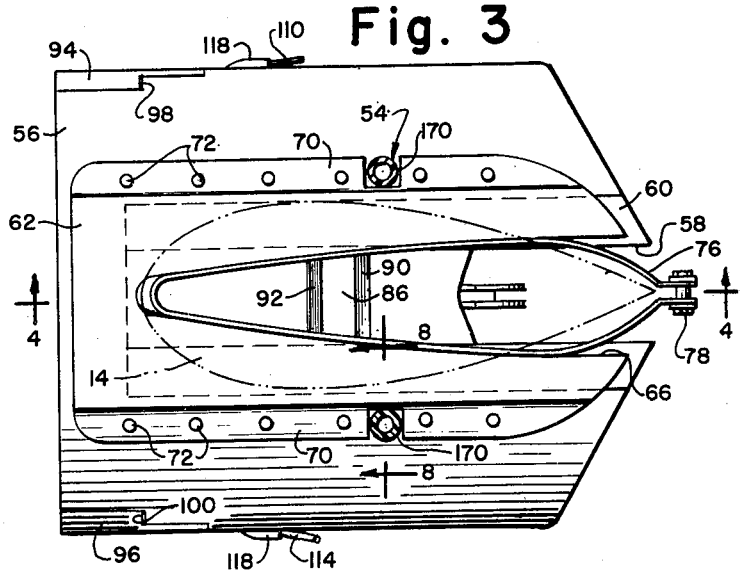
FIGURE 3 is an enlarged sectional view taken along the line 3—3 of FIGURE 1 showing the structure of the outboard propulsion unit in broken lines.
Figure 4:
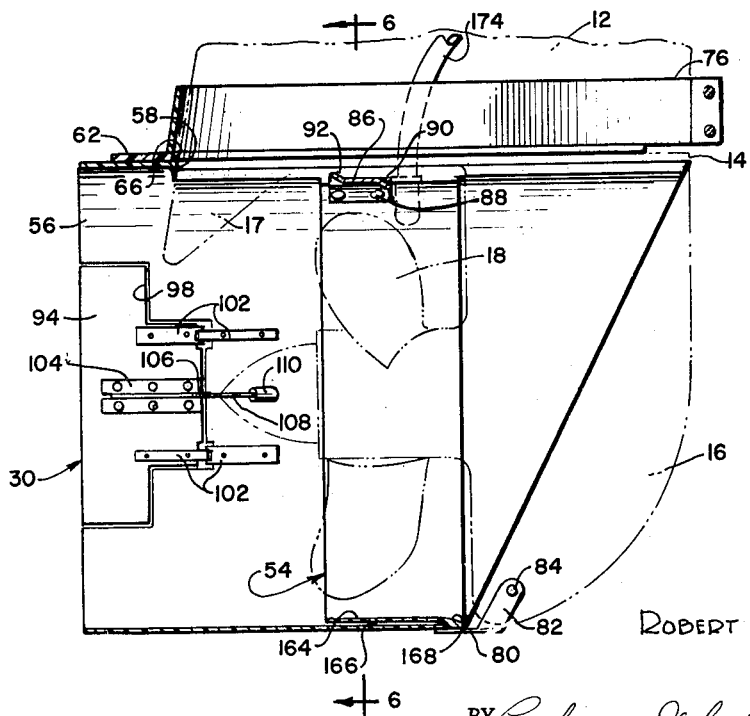
FIGURE 4 is a sectional view taken along the line 4—4 of FIGURE 3.

As best shown in FIGURES 3–7, the stabilizing anti-cavitation guard unit 28 preferably comprises a tubular duct-like shroud or member 56 which is substantially cylindrical in form. The member 56 may be made of any suitable material such as reinforced molded plastic or fabricated sheet metal. Reinforced plastic is preferred since it can be conveniently molded, although sheet aluminum can also be used to good advantage. The cylindrical member 56 is secured to the frame 12 of the outboard propulsion unit 10 in surrounding relation to the propeller 18 with its axis in concentric relation to the axis of rotation of the propeller. As best shown in FIGURES 3 and 4 a longitudinally extending opening 58 is formed in the upper forward portion of the member 56 and the outer surface of the longitudinal edges defining the opening are provided with thickened longitudinally extending bosses 60 defining flat portions for engaging the undersurface of the sides of the cavitation plate 14.

In order to retain the portions 60 in engagement with the undersurface of the sides of the cavitation plate 14, a generally rectangular attaching plate 62 is disposed above the portions 60. This attaching plate includes a forward longitudinal opening 66 which is suitably shaped to receive the portion of the propulsion unit frame 12 extending above the cavitation plate 14. The portions of the attaching plate defining the opening extend horizontally outwardly therefrom and provide flat undersurfaces for engaging the upper surfaces of the sides of the cavitation plate 14. The attaching plate along the outer marginal edges thereof is curved downwardly, as indicated at 68 and best shown in FIGURES 5, 6 and 8, and then outwardly into an arcuate formation as indicated at 70, to engage the outer peripheral surface of the cylindrical member 56. These arcuate portions 70 are rigidly secured to the cylindrical member by any suitable means, and, as shown, there are a plurality of rivets 72 utilized for this purpose. It will be understood that where molded plastics are employed the securement can be effected by a suitable cement or the like or any desired fastening means may be employed such as bolts, rivets, welding or the like where sheet metal is employed.

The upper surfaces of the boss portions 60 and the lower surfaces of the straight portions of the attaching plate 62 define longitudinally extending pockets 74 which serve to receive the sides of the cavitation plate. Moreover, these pockets open forwardly so as to permit the cylindrical member 56, with the attaching plate 62 fixed thereto, to be moved longitudinally forwardly into surrounding relation to the cavitation plate. It will be noted that during this movement, the opening 58 formed in the member 56 receives the propulsion unit frame 12 disposed below the cavitation plate while the opening 66 in the attaching plate 62 receives the frame portion extending above the cavitation plate.

In order to retain the cylindrical member 56 and attaching plate 62 in surrounding relation to the cavitation plate, a securing band 76 of a shape generally conforming to the cross-sectional configuration of the unit frame above the cavitation plate is secured along a substantial portion of its lower edge, as by welding or the like, to a substantial part of the peripheral edge surfaces defining the opening 66 in the attaching plate 62. The forward ends of the securing band are free from securement to the attaching plate and are capable of being bent outwardly to permit relative passage of the frame therebetween when the cylindrical member is mounted on the propulsion unit. The free ends of the band are then moved together so as to embrace the forward surface of the frame structure and are suitably connected together, as by bolt and washer plate assemblies 78.

The forward edge of the cylindrical member 56 extends rearwardly and downwardly and the lowermost portion thereof has one end of a mounting bracket 80 suitably fixed to the outer periphery thereof. The mounting bracket 80 includes a pair of transversely spaced upwardly and outwardly extending arms 82 which are adapted to receive therebetween the lower end of the skeg 16 of the propulsion unit 10. The arms 82 are secured to the skeg by any suitable means, such as a bolt 84 or the like. Here again, the exact configuration of the bracket 80 may be suitably varied to accommodate the precise structure of different outboard propulsion units.

It will be noted that the rearward portion of the openings 58 and 66 formed in the cylindrical member 56 and attaching plate 62, respectively, are arranged to receive the trailing fin 17 or exhaust duct of the propulsion unit frame 12. In some units, the water inlet for the cooling system of the internal combustion engine is mounted at the forward portion of this trailing fin or exhaust duct and, in order that an adequate supply of water will be presented to this water inlet when the guard unit 28 of the present invention is applied thereto, there is provided a deflector plate 86 which extends transversely across the opening 58 in the central upper portion of the cylindrical member 56 in a position just forward of the fin 17. The deflector plate 86 has opposite ends detachably secured to the inner periphery of the cylindrical member, as by bolts 88 or the like, and the central portion thereof is bent so that its leading marginal edge is turned downwardly, as indicated at 90, and its trailing marginal edge is turned upwardly, as indicated at 92.

As best shown in FIGURES 1, 2, 4, 9 and 10, the rudder means 30 of the present invention is preferably in the form of a pair of vane or rudder elements 94 and 96 shaped to conform to the plane of the cylindrical member 56 and mounted in corresponding openings 98 and 100 formed in opposite sides of the cylindrical member at the trailing end thereof. Each rudder element is mounted on the cylindrical member for pivotal steering movements about an upright axis from a position of alignment with the cylindrical member to a limiting position disposed inwardly thereof by any suitable means, such as a cooperating pair of upper and lower strap hinges 102 suitably fixed to the interior surface of the cylindrical member 56 and the interior surface of the cylindrical surface of the associated rudder element. It will be understood that the pivot pins of the upper and lower hinges are in alignment so as to provide a common upright pivotal axis for the associated rudder element.

The rudder elements 94 and 96 are arranged to be moved from their normal in-line position, such as shown in solid lines in FIGURE 9, to an inward limiting position, such as shown in phantom lines in FIGURE 9, in response to the movement of the steering arm 46 of the steering bracket unit 32. To this end, each rudder element has a bracket 104 secured to the central interior surface thereof, each bracket including a horizontally inwardly extending flange 106. The bracket 104 associated with the steering element 94 has the inwardly extending end of its flange 106 fixedly connected with one end of a steering cord or cable 108 which is made of stainless steel. The cable 108 extends through an outer flexible tube 110 which preferably is made of nylon. In a like manner, the inner end of the flange 106 associated with the opposite rudder elements 96 is connected with one end of a second steering cable 112 which likewise extends through a flexible tube 114. As best shown in FIGURE 9, the end of each of the flexible tubes 110 and 114 adjacent the associated rudder element is secured to the adjacent outer periphery of the cylindrical element 56 by any suitable means, such as a clip 116 having a horizontally extending guide bracket 118 fixedly mounted thereover, the guide bracket leading at its rearward end to an inclined opening 120 in the cylindrical member through which the rearward extremity of the associated tube extends so as to permit the associated steering cable to extend rearwardly therefrom to its point of connection with the associated flange 106, as is best shown in FIGURES 9 and 10.

Figure 11:
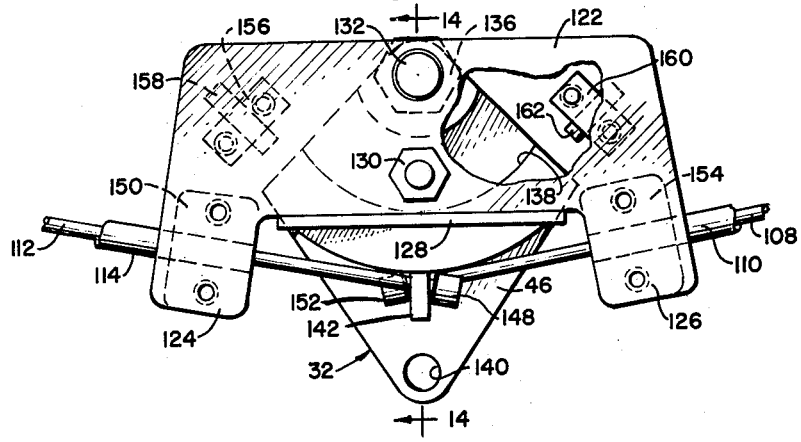
FIGURE 11 is an enlarged fragmentary sectional view taken along the line 11—11 of FIGURE 1, showing the position of the parts in their neutral condition.
Figure 12:
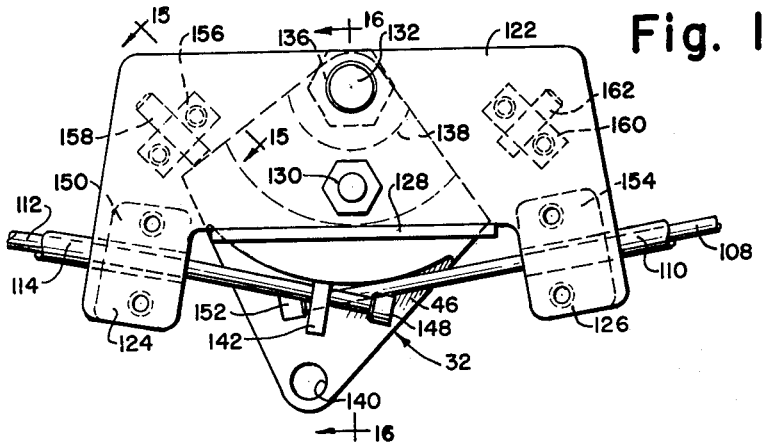
FIGURE 12 is a view similar to FIGURE 11 showing the parts moved into one limiting position thereof.
Figure 13:
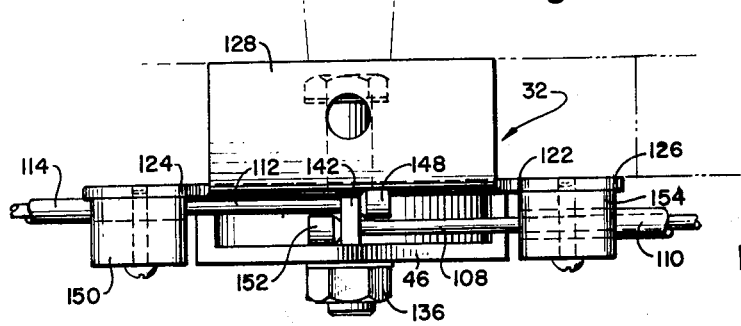
FIGURE 13 is an elevational view of the structure shown in FIGURE 11.

Referring now more particularly to FIGURES 11-15, the steering bracket unit 32 preferably comprises a main bracket plate 122 which includes a generally horizontally extending rectangular portion having a pair of forwardly extending transversely spaced projecting portions 124 and 126 thereon. Formed integrally with the bracket plate 122 and extending upwardly between the projecting portions 124 and 126 is a vertical plate portion 128. As best shown in FIGURES 13 and 14, the central portion of the plate 122 and the vertical portion 128 are arranged to engage the forward central portion of the frame 12 of the unit 10 so as to be rigidly secured thereto by any suitable means, such as bolts 130.

Fixed to the rearward central portion of the bracket plate 122, as by welding or the like, and extending downwardly therefrom is a vertical pivot bolt 132 upon which the steering arm 46 is pivotally mounted. The steering arm 46 is generally of diamond shaped configuration in plan and is provided with a vertical opening 134 at its rearward end for receiving the bolt 132, the latter having a suitable nut 136 threaded on the lower end thereof for retaining the steering arm on the bolt 132. The upper surface of the steering arm is preferably provided with an arcuate groove 138 within which the head of the attaching bolt 132 may extend during pivotal movements of the arm. The forward end of the steering arm 46 is of reduced thickness and has a vertical opening 140 in the forward extremity thereof within which the adjacent ends of the cables 40 and 48 of the remote control steering system 34 are secured.

Spaced rearwardly from the opening 140 in the central portion of the steering arm 46 is an upstanding integral lug 142 having a pair of vertically spaced openings 144 and 146 extending transversely therethrough. As best shown in FIGURES 11-13, the end of the steering cable 112 opposite from the rudder element 96 extends through the upper opening 144 and has a collar 148 secured thereto. The adjacent end of the associated flexible tube 114 is secured in proper alignment beneath the projection portion 124 of the bracket plate 122 by means of a mounting block 150. In a like manner, the end of the cable 108 remote from the rudder element 94 extends through the lower opening 146 and has a collar 152 fixed thereto, while the adjacent end of the associated flexible tube 110 is secured beneath the adjacent projection portion 126 by a mounting block 154.

As best shown in FIGURES 11 and 12, it can be seen that when the steering arm 46 is moved from the position shown in FIGURE 11 to the position shown in FIGURE 12, the lug 142 will engage the collar 152 connected with the end of the cable 108 and effect a longitudinal movement of the cable within the flexible tube 110. This movement of the cable 108 will, in turn, effect a pivotal steering movement of the rudder element 94 from its position of alignment with the cylindrical member to its inward limiting position. At the same time, it will be noted that the opposite rudder element 96 will be maintained in its position of alignment with the cylindrical member since the lug 142 is moving in a direction away from the collar 148 on the end of the cable 112.

Means is provided for limiting the inward movement of the rudder element 94, which means is embodied in the steering bracket unit 32, although it will be understood that such means may be directly associated with the rudder element itself, if desired. As best shown in FIGURES 11, 12 and 15, the limiting means preferably comprises a block 156 secured to the undersurface of the bracket plate 122 adjacent the projecting portion 124. Threadedly mounted within the block 156 is an abutment pin or bolt 158, the inner end of which is disposed in the path of movement of the adjacent edge of the steering arm 46, as is clearly shown in FIGURE 15.

It will be understood that the opposite rudder element 96 is moved from its in-line position with the cylindrical member 56 to its inner limiting position, as shown in dotted lines in FIGURE 9, by movement of the steering arm 46 from the position shown in FIGURE 11 in the opposite direction to that shown in FIGURE 12. Here again, it will be noted that the lug 142 will engage the collar 148 on the steering cable 112 to effect a longitudinal movement of the cable within its flexible tube 114 but, since the lug 142 is moving in a direction away from the collar 152 on the opposite steering cable 108, the associated rudder element 94 will remain in its in-line position. Again, while the means for limiting the movement of the rudder element 96 into its inner position may be either directly related to the rudder element itself or embodied in the steering bracket unit, as shown, a mounting block 160 similar to the mounting block 156 previously described is suitably fixed to the under surface of the bracket plate 122 adjacent the projecting portion 126. As before, an abutment pin or bolt 162 is threadedly mounted in the block 160 in a position to engage the adjacent edge of the steering arm.

As best shown in FIGURES 4, 6, 7 and 8, the pump means 54 preferably comprises an inner circumferential wall section 164 joined to the inner periphery of the cylindrical member 56 at its forward edge and extending rearwardly in spaced relation thereto so as to define therewith an annular low pressure duct or space 166. Preferably, the forward surface of the wall section 164 is appropriately rounded off, as indicated at 168, to provide a venturi type restriction within the cylindrical member 56. Preferably, the wall section 164 should be spaced radially from the propeller blade tip circle a distance of at least one-half inch and the trailing edge of the wall section should be located approximately one-half inch aft of the propeller blade tip circle.

It can be seen that by providing a venturi-like restriction in the cylindrical member 56 through the cooperation of the interior peripheral surface of the wall section 164 and the outer peripheral surface of the propeller hub, the water passing through this portion of the cylindrical member 56 will have a substantially increased velocity and consequently a decreased pressure. Thus, the annular duct 166 will communicate with the interior of the cylindrical member 56 at a position of low pressure. While this pressure reduces in relation to the speed of the propeller and hence the velocity of water moving through the cylindrical member, even at relatively low r.p.m. operation, sufficiently low pressures are generated in the annular duct 166 to create a pumping action sufficient to remove accumulated water from the bottom of the boat.

In order to communicate the low pressure duct 166 with the bottom of the boat, there is provided on the exterior periphery of the cylindrical member 56 on each side of the attaching plate 62 a hose connecting conduit section 170 which communicates with the duct 166 through an opening 172 formed in the cylindrical member 56. Preferably, each section 170 has a hose section 174 connected therewith, the opposite ends of the hose sections being interconnected by one branch of a T-fitting 176, the remaining branch of which has a hose section 178 connected therewith for extension to the bottom of the boat. Alternatively, two separate hose sections leading from the sections 170 directly to the bottom of the boat may be employed, if desired.

In the embodiment of the invention described above in connection with the structure shown in FIGURES 1–15, the steering assist structure including the guard unit 28 and steering bracket 32 are mounted as attachments on a conventional outboard motor. While it will be understood that the guard unit and steering bracket unit may be initially formed as an integral part of the propulsion unit, these units as attachments find particular applicability in modifying existing outboard propulsion units. The stabilizing, anticavitation guard unit 28 aside from the rudder means and pump means embodied therein, provides several advantages in the normal operation of a conventional outboard motor. The cylindrical member provides, in effect, a duct around the propeller of the outboard motor which has the effect of increasing the efficiency of the propeller so that for a given horsepower input a greater thrust to effect movement of the boat is achieved. The cylindrical member serves to prevent dissipation of the reactive forces of the propeller and concentrates these reactive forces to some extent in a longitudinal direction so that a greater component of force is available in this direction to move the boat. Moreover, the cylindrical member has a stabilizing effect in the steering of the boat since, here again, there is a concentration of the reactive forces transmitted from the propulsion unit to the boat.

The cylindrical member 56 also provides a guard around the propeller which protects the same from damage due to foreign objects striking the same. Finally, by extending the upper forward end of the cylindrical member forwardly a considerable distance, this portion of the cylindrical member provides, in effect, a cavitation plate covering an area greater than the area of the conventional cavitation plate formed on the propulsion unit. With this construction, the likelihood of the action of the propeller drawing air from the surface between the unit and the transom of the boat is reduced to a minimum.

The manner in which the guard unit 28 is connected, as an attachment to the frame of the propulsion unit is also a significant part of the present invention. The pockets 74 provided by the upper portion of the cylindrical member 56 and the attaching plate 62 serve to closely embrace the sides of the cavitation plate 14 of the propulsion unit and the band 76 serves to connect the attaching plate to the propulsion unit frame 12 in such a way that the forces transmitted between these elements are applied throughout a wide cross-sectional area, thus reducing to a minimum any concentration of forces which would tend to cause failure. In a like manner, the attaching plate is connected to the cylindrical member along substantially wide areas of contact to minimize any concentration of forces which would cause failure. By connecting the lower portion of the cylindrical member to the lower extremity of the skeg 16, as by the bracket 72, it is possible to minimize the wall thickness of the cylindrical member 56 since it is effectively supported not only at its upper portion but at its lower portion as well.

While it is preferable to connect the cylindrical member both at its upper portion and lower portion to the propulsion unit, it will be understood that it is within the contemplation of the present invention to eliminate the lower portion of the cylindrical member together with its connection to the lower extremity of the skeg. As shown in FIGURES 16 and 17, such a modification includes a guard unit 28'. This unit is similar in construction to the unit 28 previously described and corresponding structural elements thereof are designated by corresponding primed reference numerals. It will be noted that the member 56' is in the form of a section of a cylinder with the lower portion thereof removed. Thus, the leading edge of the member 56' extends downwardly and rearwardly from the upper portion thereof and merges into lower side edges 180 of the member 56'. Since there is no connection at the lower portion of the cylindrical member to the extremity of the skeg, it is necessary to form the opposite walls of the member 56' of a relatively greater thickness, as is indicated at 182, in FIGURE 17. With this construction, the full anti-cavitation advantages of the cylindrical member 56 are obtained and, to a large extent, the other advantages mentioned above are achieved by the construction shown in FIGURES 16 and 17.

Another advantage of the guard unit construction is that it readily lends itself to the provision of a pump means therein of the type described above. It will be noted that the pump means 54, as well as the pump means 54', is constructed merely by the provision of an annular wall section on the interior periphery of the cylindrical member at the position indicated above. Thus, with the guard unit construction of the present invention it is possible to provide a bilge pump for the boat merely by the provision of this annular wall section and suitable conduit for communicating the low pressure space defined by the wall section with the bottom of the boat.

Because of the advantages indicated above, it is greatly preferred that the steering vanes or rudder elements of the present invention be embodied in such a guard unit. Moreover, by generally confining the flow rearwardly of the propeller by the cylindrical member of the guard unit, the rudder elements have a more positive steering effect and the entire steering operation is stabilized to a considerable extent.

Operation

Insofar as the operation of the rudder means of the present invention is concerned, it should be initially noted that the actual steering movements of the boat are accomplished by the propulsion unit 10 in the conventional manner. The rudder means 30 is utilized merely to aid in effecting the steering movements of the unit itself. Thus, in accordance with conventional practice if it is desired to move the boat to the left as shown in FIGURE 2, then the propulsion unit is moved in a clockwise direction about its upright axis of steering. In a like manner, if movement of the boat to the right is desired, the propulsion unit is moved in a counter-clockwise direction about its upright axis. When a remote control system such as the system 34 diagrammatically shown in FIGURE 2 is utilized, the steering wheel 36 is arranged so that by effecting a clockwise rotation as viewed in FIGURE 2, the boat will turn toward the right while a counter-clockwise movement of the wheel will result in a movement of the boat to the left. It necessarily follows that the system 34 is connected with the propulsion unit so that clockwise movement of the steering wheel 36 for a right turn will result in a counter-clockwise movement of the propulsion unit; while counter-clockwise movement of the steering wheel for a left turn will result in clockwise movement of the propulsion unit.

The rudder means 30 of the present invention is mounted on the propulsion unit for movement from an in-line position toward limiting positions in opposite directions to effect movement of the propulsion unit in opposite directions respectively. Thus, where the rudder means is moved into a position such that the leading surface thereof has a component in the direction of the axis of the propeller which is disposed to the left of the associated upright steering axis of the rudder means, the propulsion unit will be caused to move in a counter-clockwise direction about its upright steering axis as viewed in FIGURE 2. Conversely, where the rudder means is moved into a position where the leading surface has a component in line with the propeller shaft disposed to the right of the associated rudder means axis, the propulsion unit will be caused to move in a clockwise direction as viewed in FIGURE 2. The exact manner in which the desired movement of the rudder means is effected in response to a given movement of the steering wheel or steering rod will be dependent upon the particular structure utilized for this purpose. For example, in most outboard motor propulsion units the steering means for the unit is connected to the upper forward portion of the frame of the unit in the manner described above. However, in the outboard propulsion units of the inboard-outboard system the steering means may be connected to the propulsion unit at a position spaced rearwardly of the steering axis of the unit, rather than forwardly thereof.

Where a remote control steering system, such as the system 34 shown in FIGURE 3, is used in conjunction with an outboard propulsion unit, such as the conventional outboard motor unit 10 shown in FIGURE 2, the rudder means 30 operates in conjunction with the steering bracket 32 as follows. Assuming that the boat is proceeding on a straight path and it is desired to make a turn to the right, the steering wheel 36 is moved in a clockwise direction. This movement has the effect of winding up on the steering column 38 the steering cable 40 and paying out the cable 48 from the steering column, which results in a movement of the steering arm 46 in a counter-clockwise direction about its pivot as viewed in FIGURE 2. Since the steering arm is pivoted to the frame for movement relative thereto between the positions of engagement with the abutment pins 158 and 162, the steering arm 46 will move relative to the propulsion unit and this movement will result in a movement of the rudder element 96 from its position in alignment with the cylindrical member 56 to a position inwardly thereof. It will also be noted that this movement of the steering arm 46 will not result in a movement of the opposite rudder element 94 for the reasons previously set forth.

The reaction of the water flowing longitudinally through the cylindrical member in the direction of the axis of rotation of the propeller on the inner surface of the inwardly disposed rudder element 94 will cause the propulsion unit 10 to move in a counter-clockwise direction, as viewed in FIGURE 2. In this way, a turning movement of the propulsion unit 10 in response to the turning movement of the steering wheel 36 is accomplished by the operation of the rudder means 30 of the present invention. It will be noted that when the propulsion unit turns in a counter-clockwise direction about its steering axis, a relative movement between the unit and the steering arm 46 will take place unless a continued turning movement of the steering wheel is effected. Thus, if only a slight turn is desired it can be seen that the steering wheel will be moved only slightly which, in turn, effects a slight movement of the steering arm relative to the propulsion unit but this relative movement will immediately effect movement of the propulsion unit. Where only a slight turning movement of the steering wheel is effected, the immediate movement of the propulsion unit will result in a relative movement between the latter and the steering arm back into its central position. The reaction of the water on the rudder element 96 will effect movement of the latter back into its in-line position. In effect, the rudder means constitutes a follow up servo mechanism and for all practical purposes the responsive movement of the propulsion unit to inward movement of either of the rudder elements is such that the rudder elements never assume their full inward limiting position. It will be understood that where a sharp turn is desired, the continuous turning movement of the steering wheel will result in maintaining the steering arm in a position relative to the propulsion unit sufficient to maintain the corresponding rudder element in an inwardly disposed position. It will further be noted that because of the position of the rudder elements relative to the propeller of the propulsion unit, they will be effective to cause the desired turning movement of the propulsion unit regardless of the relative position of the propulsion unit with respect to the boat. In other words, the rudder means is responsive to the local direction of flow resulting from the propeller rather the direction of flow of water relative to the boat. Thus, where it is desired to effect a left turn immediately following a right turn, movement of the steering wheel in a counter-clockwise direction as viewed in FIGURE 2 will have the effect of moving the rudder element 94 inwardly to thus cause the propulsion unit to move in a clockwise direction as viewed in FIGURE 2, even from an extreme position of movement in the opposite direction.

While as indicated above, in normal operation the movement of the propulsion unit as a result of an inward movement of either of the rudder elements 94 or 96 is sufficiently instantaneously responsive that the rudder elements will never reach their inward limiting positions, the provision of the abutment pins 158 and 162 makes it possible to override the operation of the rudder elements and effect a direct steering movement of the propulsion unit in response to the turning of the steering wheel. For this reason it is desirable to provide the rudder means with limited movement although it will be understood that such limited movement is not essential to the operation and, in fact, would not enter into the operation of the steering system under normal conditions.

It can be seen that with the rudder means 30 of the present invention the effort required by the operator in effecting steering movements of the propulsion unit 10 to steer the boat is limited to that effort required to effect movement of a simple rudder element rather than the effort required to effect pivotal movement of the entire propulsion unit frame. As indicated above, the movement of the propulsion unit in response to the movement of the rudder means is substantially instantaneous so that the operator has excellent control over the boat. This is particularly true with the rudder means 30 due to the stabilizing effect of the guard unit 28 which carries the same. Thus, with the present invention the steering effort required by the operator is reduced to a minimum by the provision of a simple structure which affords the operator a maximum control. With the embodiment disclosed in the drawings these advantageous results are achieved by a structure which also provides for protection of the propeller against foreign objects, increased stabilization of the steering, increased anticavitation protection and an effective bilge pump requiring no additional power and embodying no moving parts.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. Apparatus for propelling and steering a boat comprising an outboard propulsion unit mountable on a boat for steering movements in opposite directions about an upright axis, an arcuate guard structure mounted on said propulsion unit for movement therewith, a pair of horizontally spaced rudder elements mounted in said guard structure for movement with respect thereto between a first position for causing said propulsion unit to move in one direction and a second position for causing said propulsion unit to move in the opposite direction, and steering means operatively connected with said rudder means for effecting a movement of said rudder means between said first and second positions.

2. Apparatus as defined in claim 1 wherein said steering means includes a member movably mounted on said unit and means operatively connected between said movable member and said rudder means for effecting movement of the latter in response to movement of said member.

3. Apparatus as defined in claim 2 wherein said steering means further includes a steering member movably mounted adjacent the forward end of the boat and means operatively connected between said steering member and said movable member for effecting movement of the latter in response to movement of said steering member.

4. Apparatus as defined in claim 1 wherein said arcuate guard structure includes interior wall section means defining arcuate duct means communicating with the interior of said guard structure at a position of low pressure during the operation of said propulsion unit and conduit means communicating with said duct means.

5. Apparatus for propelling and sterring a boat comprising an outboard propulsion unit including a frame terminating at its lower portion in a vertically extending skeg, a horizontally extending cavitation plate formed on said frame adjacent the upper portion of said skeg and a propeller carried by said frame rearwardly of said skeg for rotation about a generally horizontally extending axis and means mounting said frame on a boat for movement about an upright axis with said propeller in the water so that rotation of said propeller will serve to propel said boat and steering movements of said frame in opposite directions about said upright axis will serve to determine the direction of propulsion of the boat by said propeller, an arcuate guard member mounted on said frame in surrounding relation to at least the upper portion of said propeller with its axis substantially concentric with the axis of said propeller, a pair of horizontally spaced rudder elements mounted on the rearward portion of said guard member in horizontally spaced relation for pivotal movement about a parallel upright axis between a first position for causing said frame to move in one direction and a second position for causing said frame to move in the opposite direction, and steering means operatively connected with said rudder elements for effecting movement of said rudder elements between said first and second positions.

6. Apparatus as defined in claim 5 wherein said guard member includes pump wall section means provided thereon, said pump wall section means being joined at the forward end thereof with the interior surface of said guard member and extending rearwardly in spaced relation thereto to define therewith pump duct means, said pump duct means communicating at the rearward end thereof with the interior of said guard member at a position spaced rearwardly of the blade tip circle of said propeller which constitutes an area of relatively low water pressure when said propeller is rotated in water, and conduit means communicating with said duct means for extension to the bottom of the boat whereby water therein may be drawn through said conduit means and said duct means as a result of the low water pressure communicating with the latter.

7. Apparatus as defined in claim 6 wherein said guard member includes means for fixedly securing the latter to said propulsion unit frame, said securing means comprising an attaching plate extending generally horizontally above the upper central portion of said guard member substantially throughout the longitudinal extent thereof, said attaching plate having a central opening therein extending longitudinally from one end thereof, said opening being of a size to receive said propulsion unit frame adjacent and above said cavitation plate, said attaching plate being fixedly secured along its sides to the exterior of said guard member at positions spaced transversely apart a distance greater than the greatest width of said cavitation plate, the upper portion of said guard member having a central opening extending longitudinally from the adjacent end thereof, said guard member opening being of a size to receive the upper portion of said skeg adjacent and beneath said cavitation plate, the upper surfaces of said guard member and lower surfaces of said attaching plate between said portions of securement defining pockets receiving the sides of said cavitation plate with the upper surfaces of said guard member and the lower surfaces of said attaching plate in engagement with the lower and upper surfaces of said cavitation plate sides respectively, a band-like member fixed to said attaching plate along the opening therein and extending upwardly therefrom, and means for securing said band-like member in substantially surrounding relation to the adjacent portion of said propulsion unit frame.

8. A steering assist unit for attachment to an outboard propulsion unit of the propeller type adapted to be mounted on a boat for steering movements in opposite directions about an upright axis comprising a guard member arcuate about a generally horizontally extending axis, means for fixedly securing said guard member on said propulsion unit in surrounding relation to at least the upper portion of the propeller of said propulsion unit with its axis substantially concentric with the axis of the propeller, said guard member having horizontally spaced openings formed in the rearward portion thereof, a pair of rudder elements mounted in said openings for pivotal movement from positions of alignment with said guard member to positions extending inwardly thereof for causing said propulsion unit to move in opposite directions, and steering means operatively connected with said rudder elements for effecting a movement of said rudder elements from said positions of alignment to said inwardly extending positions.

9. A steering assist unit as defined in claim 8 wherein said guard member has pump wall section means provided thereon, said pump wall section means being joined at the forward end thereof with the interior surface of said guard member and extending rearwardly in spaced relation thereto to define therewith pump duct means, said pump duct means communicating at the rearward end thereof with the interior of said guard member at a position spaced rearwardly of the blade tip circle of said propeller which constitutes an area of relatively low water pressure when said guard member is mounted in surrounding relation to said propeller and the latter is rotated in water, and conduit means communicating with said duct means for extension to the bottom of the boat whereby water therein may be drawn through said duct means and said duct means as a result of the low water pressure communicating with the latter.

10. A stabilizing, anti-cavitation guard and steering assist unit for an outboard propulsion unit of the type including a frame terminating at its lower portion in a skeg, a propeller carried by said frame rearwardly of said skeg for rotation about a generally horizontally extending axis, a horizontally extending cavitation plate on said frame above said propeller adjacent the upper portion of said skeg, and means for mounting said frame on a boat for movement about an upright axis with said propeller in the water so that operation of said propeller will serve to propel said boat and steering movements of said frame in opposite directions about said upright axis will serve to determine the direction of propulsion of the boat by said propeller, said guard and steering assist unit comprising a guard member arcuate about a generally horizontally extending axis, means for fixedly securing said guard member on the frame of said propulsion unit in surrounding relation to at least the upper portion of said propeller with its axis substantially concentric with the axis of said propeller, a pair of rudder elements mounted in the rearward portion of said guard member in horizontally spaced relation for movement about horizontally spaced upright axes from a position of alignment with said guard member to an inwardly disposed position, each of said rudder elements when disposed in its inward position being operable as a result of the reaction of the prop wash from said propeller when in operation to effect movement of said propulsion unit frame in one direction about said upright axis, and steering means operatively connected with each of said rudder elements for effecting a movement thereof from said position of alignment to said inwardly disposed position.

11. A guard and steering assist unit as defined in claim 10 wherein said guard member has pump wall section means provided thereon, said pump wall section means being joined at the forward end thereof with the interior surface of said guard member and extending rearwardly in spaced relation thereto to define therewith pump duct means, said pump duct means communicating at the rearward end thereof with the interior of said guard member at a position spaced rearwardly of the blade tip circle of said propeller which constitutes an area of relatively low water pressure when said guard member is mounted in surrounding relation to said propeller and the latter is rotated in water, and conduit means communicating with said duct means for extension to the bottom of the boat whereby water therein may be drawn through said conduit means and said duct means as a result of lower water pressure communicating with the latter.

12. A guard and steering assist unit as defined in claim 11 wherein said guard member securing means comprises an attaching plate extending generally horizontally above the upper central portion of said guard member substantially throughout the longitudinal extent thereof, said attaching plate having central opening therein extending longitudinally from one end thereof, said opening being of a size to receive said propulsion unit frame adjacent and above said cavitation plate, said attaching plate being fixedly secured along its sides to the exterior of said guard member at positions spaced transversely apart a distance greater than the greatest width of said cavitation plate, the upper portion of said guard member having central opening extending longitudinally from the adjacent end thereof, said guard member opening being of a size to receive the upper portion of said skeg adjacent and beneath said cavitation plate, the upper surfaces of said guard member and the lower surfaces of said attaching plate between said positions of securement defining pockets for receiving the sides of said cavitation plate with the upper surfaces of said guard member and the lower surfaces of said attaching plate in engagement with the lower and upper surfaces of said cavitation plate sides respectively, a band-like member fixed to said attaching plate along the opening therein and extending upwardly therefrom and means for securing said band-like member in substantially surrounding relation to the adjacent portion of said propulsion unit frame.

13. A guard and steering assist unit as defined in claim 10 wherein said guard member is of an arcuate extent sufficient to surround the lower portion of said propeller and said guard member securing means includes means for connecting the lower forward portion of said guard member with the lower extremity of the skeg.

14. A guard and steering assist unit as defined in claim 10 wherein said guard member is of an arcuate extent to surround the upper portion only of said propeller and terminates at its lower portion in horizontally spaced rearwardly extending edges.

15. A stabilizing anti-cavitation guard unit for an outboard propulsion unit of the type including a frame terminating at its lower portion in a skeg, a propeller carried by said frame rearwardly of said skeg for rotation about a generally horizontally extending axis and a horizontally extending cavitation plate on said frame above said propeller adjacent the upper portion of said skeg, said guard unit comprising a guard member arcuate about a generally horizontally extending axis, and means for fixedly securing said guard member on the frame of said propulsion unit in surrounding relation to at least the upper portion of said propeller with its axis substantially concentric with the axis of said propeller, said securing means comprising an attaching plate extending generally horizontally above the upper central portion of said guard member substantially throughout the longitudinal extent thereof, said attaching plate having a central opening therein extending longitudinally from one end thereof, said opening being of a size to receive said propulsion unit frame adjacent and above said cavitation plate, said attaching plate being fixedly secured along its sides to the exterior of said guard member at positions spaced transversely apart a distance greater than the greatest width of said cavitation plate, the upper portion of said guard member having a central opening extending longitudinally from the adjacent end thereof, said guard member opening being of a size to receive the upper portion of said skeg adjacent and beneath said cavitation plate, the upper surfaces of said guard member and the lower surfaces of said attaching plate between said positions of securement defining pockets for receiving the sides of said cavitation plate with the upper surfaces of said guard member and the lower surfaces of said attaching plate in engagement with the lower and upper surfaces of said cavitation plate sides respectively, a band-like member fixed to said attaching plate along the opening therein and extending upwardly therefrom and means for securing said band-like member in substantially surrounding relation to the adjacent portion of said propulsion unit frame.

16. A guard unit as defined in claim 15 wherein said guard member has an arcuate extent sufficient to surround the lower portion of the propeller when mounted on said propulsion unit frame and wherein said guard member securing means further includes means for connecting the lower forward portion of said guard member to the lower extremity of the skeg of said propulsion unit.

17. A guard unit as defined in claim 15 wherein said guard member has an arcuate extent sufficient to surround the upper portion only of the propeller and the lower portion of said guard member terminates in a pair of horizontally spaced rearwardly extending edges.

18. A guard unit as defined in claim 15 wherein said guard member has a pair of horizontally spaced openings formed in the rearward portion thereof, a pair of rudder elements connected with said guard member for pivotal movement about horizontally spaced upright axes from a position of alignment within said openings to a position disposed inwardly of said guard member, and steering means operatively connected with said rudder elements for effecting movement of each of said rudder elements from its position of alignment to its inwardly disposed position.

19. A guard unit as defined in claim 15 wherein the forward edge of said guard member extends downwardly and rearwardly, the upper forward portion of said guard member when mounted on said propulsion unit being disposed forwardly of the forward end of the cavitation plate of said propulsion unit.

20. A stabilizing anti-cavitation guard unit for an outboard propulsion unit of the type including a frame terminating at its lower portion in a skeg, a propeller carried by said frame rearwardly of said skeg for rotation about a generally horizontally extending axis, a horizontally extending cavitation plate on said frame above said propeller adjacent the upper portion of said skeg, and a rearward fin having a water inlet therein and extending downwardly from the rearward portion of said cavitation plate in spaced relation with said skeg, said guard unit comprising a guard member arcuate about a generally horizontally extending axis, means for fixedly securing said guard member on the frame of said propulsion unit in surrounding relation to at least the upper portion of said propeller with its axis substantially concentric with the axis of said propeller, and a deflector plate having its ends detachably fixedly secured to said guard member and extending across the opening in said guard member in a position to deflect water passing through said guard unit upwardly toward the water inlet in the rearward fin of the propulsion unit.

21. A guard unit as defined in claim 20 wherein said guard member securing means comprises an attaching plate extending generally horizontally above the upper central portion of said guard member substantially throughout the longitudinal extent thereof, said attaching plate having a central opening therein extending longitudinally from one end thereof, said opening being of a size to receive said propulsion unit frame adjacent and above said cavitation plate, said attaching plate being fixedly secured along its sides to the exterior of said guard member at positions spaced transversely apart a distance greater than the greatest width of said cavitation plate, the upper portion of said guard member having a central opening extending longitudinally from the adjacent end thereof, said guard member opening being of a size to receive the upper portion of said skeg adjacent and beneath said cavitation plate, the upper surfaces of said guard member and the lower surfaces of said attaching plate between said positions of securement defining pockets for receiving the sides of said cavitation plate with the upper surfaces of said guard member and the lower surfaces of said attaching plate in engagement with the lower and upper surfaces of said cavitation plate sides respectively, a band-like member fixed to said attaching plate along the opening therein and extending upwardly therefrom and means for securing said band-like member in substantially surrounding relation to the adjacent portion of said propulsion unit frame.

22. A pump and guard unit for a propeller of a boat comprising a guard member arcuate about a substantially horizontal axis, means for fixedly mounting said guard member in surrounding relation at least to the upper portion of said propeller with its axis substantially concentric with the axis of rotation of said propeller, and pump wall section means joined at the forward end thereof with the interior surface of said guard member and extending arcuately rearwardly in spaced relation thereto to define therewith arcuate pump duct means, said pump duct means communicating at the rearward end thereof with the interior of said guard member at a position spaced rearwardly of the blade tip circle of said propeller which constitutes an area of relatively low water pressure when said guard member is mounted in surrounding relation to said propeller and the latter is rotated in water, and conduit means communicating with said duct means for extension to the bottom of the boat whereby water therein may be drawn through said conduit means and said duct means as a result of the low water pressure communicating with the latter.

23. A pump and guard unit as defined in claim 22 wherein said guard member has an arcuate extent sufficient to surround the lower portion of the propeller.

24. A pump and guard unit as defined in claim 22 wherein said guard member has an arcuate extent sufficient to surround the upper portion only of the propeller and the lower portion of said guard member terminates in a pair of horizontally spaced rearwardly extending edges.

25. A pump and guard unit as defined in claim 22 wherein said guard member has a pair of horizontally spaced openings formed in the rearward portion thereof, a pair or rudder elements connected with said guard member for pivotal movement about horizontally spaced upright axes from a position of alignment within said openings to a position disposed inwardly of said guard member and steering means operatively connected with said rudder elements for effecting movement of each of said rudder elements from its position of alignment to its inwardly disposed position.

References Cited in the file of this patent

UNITED STATES PATENTS

| | | |
|---|---|---|
| 1,475,695 | Golden | Nov. 27, 1923 |
| 2,627,242 | Kiekhaefer | Feb. 3, 1953 |
| 2,711,151 | Shoemaker | June 21, 1955 |
| 2,963,000 | Fester | Dec. 6, 1960 |
| 2,993,464 | Conover | July 25, 1961 |
| 2,996,031 | Easter | Aug. 15, 1961 |